United States Patent
Ybarra, III

(10) Patent No.: US 8,473,078 B1
(45) Date of Patent: Jun. 25, 2013

(54) SYSTEMS AND METHODS FOR TARGET OPTIMIZATION USING REGRESSION

(75) Inventor: Paul Neri Ybarra, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 34 days.

(21) Appl. No.: 11/551,080

(22) Filed: Oct. 19, 2006

(51) Int. Cl.
*G05B 13/02* (2006.01)
*G06Q 10/00* (2012.01)
*G06F 17/00* (2006.01)

(52) U.S. Cl.
USPC ............. 700/28; 700/51; 705/7.12; 705/7.23; 705/7.37

(58) Field of Classification Search
USPC ............... 700/28, 51; 705/10, 36 R, 37, 7.12, 705/7.23, 7.37; 706/47, 925
See application file for complete search history.

(56) References Cited

U.S. PATENT DOCUMENTS

| | | | | |
|---|---|---|---|---|
| 5,189,606 | A * | 2/1993 | Burns et al. | 705/10 |
| 6,021,397 | A * | 2/2000 | Jones et al. | 705/36 R |
| 6,775,647 | B1 * | 8/2004 | Evans et al. | 703/7 |
| 7,006,980 | B1 * | 2/2006 | Snyder | 705/10 |
| 7,305,392 | B1 * | 12/2007 | Abrams et al. | 707/9 |
| 7,457,786 | B2 | 11/2008 | Aragones et al. | |
| 7,818,275 | B2 * | 10/2010 | Bertrand et al. | 706/45 |
| 7,840,476 | B1 * | 11/2010 | Zack et al. | 705/37 |
| 7,877,286 | B1 * | 1/2011 | Neal et al. | 705/10 |
| 7,882,137 | B2 * | 2/2011 | Lepman | 707/793 |
| 8,340,789 | B2 * | 12/2012 | Wintrich et al. | 700/48 |
| 2002/0046157 | A1 * | 4/2002 | Solomon | 705/37 |
| 2003/0220860 | A1 * | 11/2003 | Heytens et al. | 705/35 |
| 2004/0103013 | A1 * | 5/2004 | Jameson | 705/7 |
| 2005/0096963 | A1 | 5/2005 | Myr et al. | |
| 2005/0283818 | A1 | 12/2005 | Zimmermann et al. | |
| 2007/0100475 | A1 * | 5/2007 | Korchinski | 700/28 |
| 2008/0005002 | A1 * | 1/2008 | Ferris | 705/36 R |
| 2008/0027774 | A1 * | 1/2008 | Jameson | 705/7 |
| 2008/0288321 | A1 | 11/2008 | Dillon et al. | |
| 2010/0274367 | A1 * | 10/2010 | Kaufman et al. | 700/31 |

FOREIGN PATENT DOCUMENTS

WO WO 2006095174 A2 * 9/2006

OTHER PUBLICATIONS

Haykin, Simon S., "Back-Propagation Learning—Chapter 17", *Adaptive filter theory*, Upper Saddle River, N.J. : Prentice Hall, 4th ed., (2002), 736-761.

* cited by examiner

*Primary Examiner* — Mohammad Ali
*Assistant Examiner* — Jennifer L Norton
(74) *Attorney, Agent, or Firm* — Brooks, Cameron & Huebsch, PLLC

(57) ABSTRACT

Systems and methods for target optimization using regression are described. The system includes a regression subsystem to generate a function based on metric relationships, and an optimization subsystem to determine parameter values associated with an optimized target. Other embodiments may be described and claimed.

18 Claims, 7 Drawing Sheets

SYSTEMS AND METHODS FOR TARGET OPTIMIZATION USING REGRESSION

CROSS REFERENCES

This application is related to U.S. application titled "SYSTEMS AND METHODS FOR TARGET OPTIMIZATION USING REGRESSION" Ser. No. 11/551,106 and U.S. application titled "SYSTEMS AND METHODS FOR TARGET OPTIMIZATION USING REGRESSION" Ser. No. 11/551,118 filed on even date herewith.

TECHNICAL FIELD

Various embodiments described herein relate to optimization systems and methods generally and more specifically to systems and methods for target optimization using regression.

BACKGROUND

Optimization has historically been performed by using so-called "Rules-of-Thumb" provided by vendors and industry experts. The techniques for optimization are general and do not typically account for the unique properties of the system to be optimized. In conjunction with or in place of industry best-practices is the "trial and error" technique where a change is made and a determination is made on whether the effect was in the optimal direction. "Trial and error" techniques are performed by changing only a few parameters, and the effect on the overall optimization is subjectively determined, as it is not known whether any "in-between" adjustment may have produced a better result. Ultimately, both techniques suffer from a high potential to miss the absolute optimal settings and are very time consuming. A technique that measures the response of a system under various configurations and analyzes the result in a methodical manner is needed to achieve consistent, reliable, repeatable, and optimal results.

SUMMARY

Systems and methods for target optimization using regression are described. The system includes a regression subsystem to generate a function based on metric relationships, and an optimization subsystem to determine parameter values associated with an optimized target. Other embodiments are also described.

DETAILED DESCRIPTION

The following detailed description is divided into four sections. The first section presents a system overview of the inventive subject matter. The second section provides methods of using example embodiments of the inventive subject matter. The third section describes example implementations. The fourth section describes the hardware and the operating environment in conjunction with which embodiments can be practiced.

System Level Overview

Figure 1:
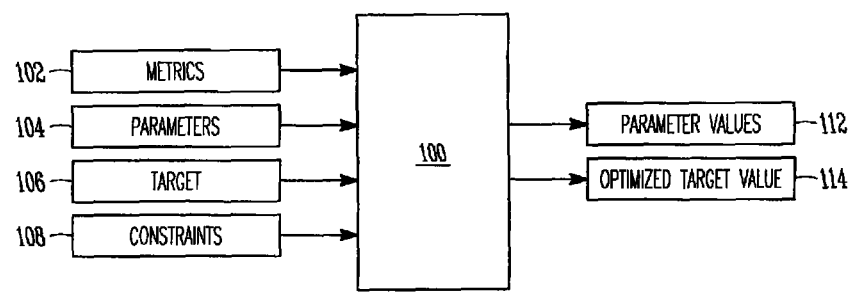
FIG. 1 is a block diagram of an optimization system according to various embodiments.

FIG. 1 comprises a block diagram of an optimization system 100 according to various embodiments. The system 100 receives metrics 102, parameters 104, a target 106, and constraints 108. These inputs are used to determine appropriate parameter values 112 corresponding to the input parameters 104 in order to generate an optimized target value 114.

The metrics 102 include representative data which pertains to the subject matter being optimized. The metrics 102 provide data that will allow the system 100 to determine relationships between other independent metrics 102, the parameters 104 and the target 106. Constraints 108 input into the system 100 may affect the values assigned to certain parameters 104. Constraints 108 are not necessary, but may be optionally used. With these inputs, the system 100 can determine the parameter values 112 which will be necessary to produce an optimized target value 114. An optimized target value 114 may comprise a minimum value, a maximum value or a constant depending on the particular application.

Figure 2:
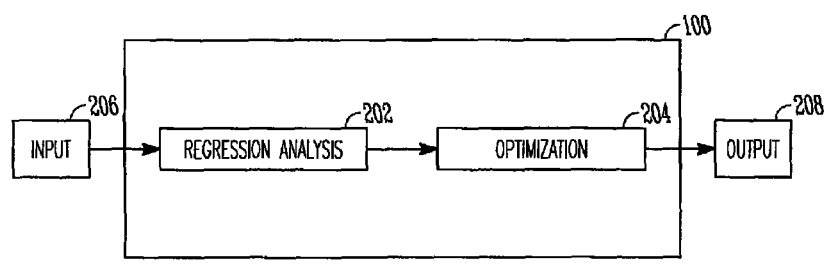
FIG. 2 is a more detailed block diagram of an optimization system of FIG. 1 according to various embodiments.

FIG. 2 comprises a block diagram of the optimization system 100 in accordance with various embodiments. Input data 206 is received by the system 100 and is analyzed in a regression subsystem 202. The regression subsystem 202 uses statistical regression techniques to determine the relationships existent in the input data 206. Once determined, the relationships between the input data 206 may be analyzed by the optimization subsystem 204. The optimization subsystem 204 determines the output data 208 which will produce a desired optimized result based on the input data 206.

Figure 3:
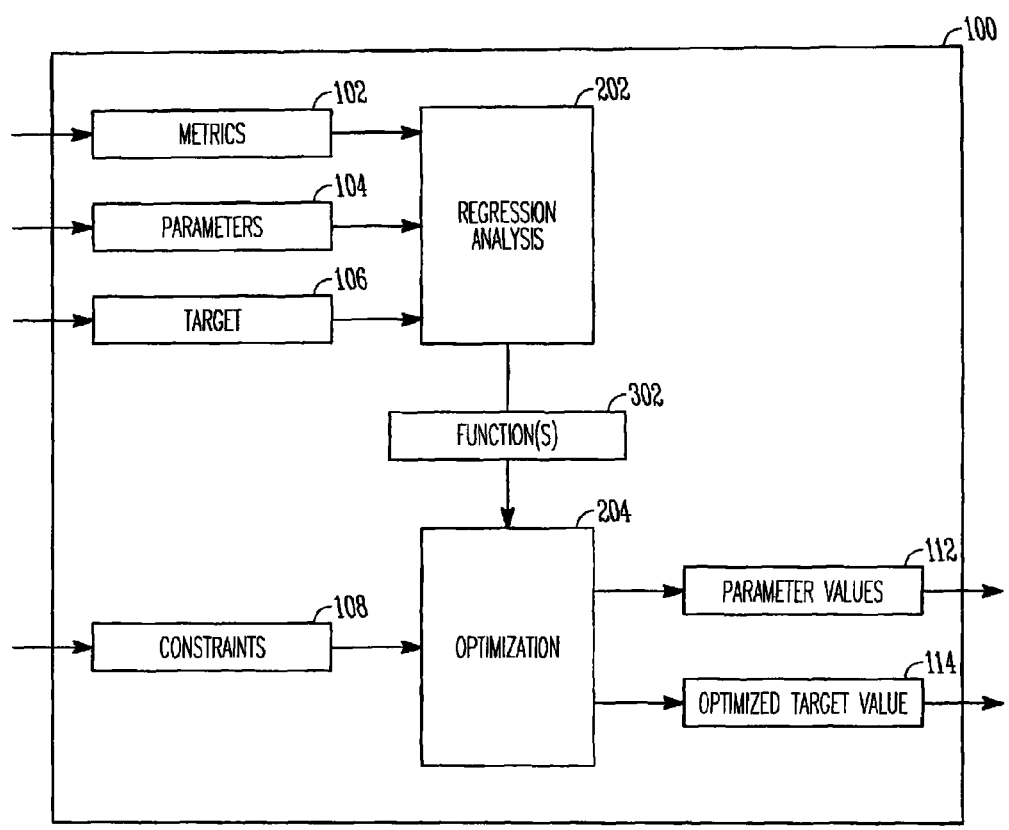
FIG. 3 is a more detailed block diagram of an optimization system according to various embodiments.

FIG. 3 shows a block diagram of the optimization system 100 in more detail. The metrics 102, the parameters 104, and the target 106 are input into the regression subsystem 202. The regression subsystem 202 analyzes the data from the metrics 102 and parameters 104 to discover if there are any relationships between them. Generally the relationships between the metrics and parameters may be linear or non-linear, and a regression analysis will create a curve represented by some type of continuous function or functions 302. Based on the relationship between the metrics 102, the parameters 104 and the target 106, the regression subsystem can define a continuously differentiable relationship represented by a function or functions 302. The regression equations derived provide a continuous equation that can then be differentiated and optimized, even though the input data were collected by sampling and were thus only known for discrete instants in time. The function or functions 302 created by the regression subsystem 202 defines the target 106 in terms of the metrics 102 and parameters 104. Accordingly, the target 106 may be represented as a dependent variable with the metrics 102 and the parameters 104 being the independent variables. Thus, the manipulation of any parameter 104 or a change in the value of any metric 102 will affect the target 106.

It is possible, however, that one or more of the metrics 102 or the parameters 104 that are input into the regression subsystem 202 may be found to not have a relationship with the target. In this case, the function or functions 302 generated by the regression subsystem 202 would not include those particular metrics or parameters, or would only include such parameters with a coefficient of 0.

Once the regression subsystem 202 has generated a function or functions 302, it is handed off to the optimization subsystem 204. The optimization subsystem 204 may also receive any constraints 108 which set limits on the values that may be applied to the parameters 104 in the function 302. With this information, the optimization subsystem 204 will determine the necessary parameter values 112 to generate an optimized target value 114.

The regression subsystem 202 may comprise any number of statistical and mathematical techniques for generating a regression function based on the relationships present within input data 206. Similarly, the optimization subsystem 204 may comprise any number of techniques for minimizing, maximizing, or locating a fixed value for a function or functions 302.

According to various embodiments, the optimization system disclosed may be applied to allow an application to be optimized at any time. The system allows adaptation of an application's parameters in order to continue optimizing a particular result. An application may be updated with the optimization system when one or more factors occur that could affect the target result; for example when a policy is changed, or when new hardware or software is installed. Rather than having a condition where parameters or characteristics stay fixed as time progresses, the optimization system allows the application to self-modify in order to maintain the desired target. New optimized values may be generated by initiating the optimization system manually or automatically either periodically or in response to some event.

Methods

In this section, particular methods of example embodiments are described by reference to a series of flow charts. The methods to be performed may constitute computer programs made up of computer-executable instructions.

Figure 4:
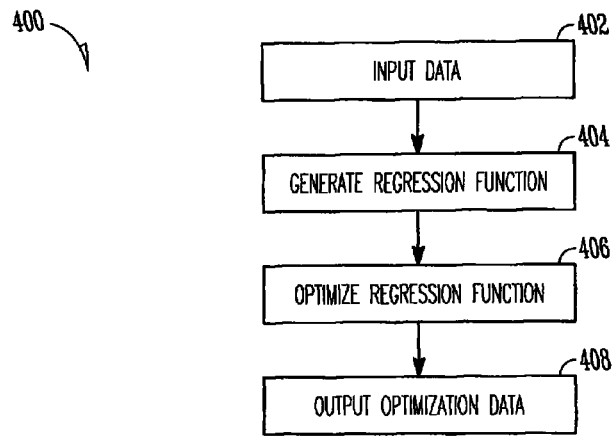
FIG. 4 is a flow diagram illustrating a method according to various embodiments.

FIG. 4 is a simple flow diagram illustrating a method 400 according to various embodiments. The method 400 begins with data being input into a system (block 402). This data is analyzed and a regression function is generated based on the relationships within the data (block 404). Once the function is generated, it may be optimized to determine what specific data would produce either a minimum, maximum or fixed-value result (block 406). Once determined, the optimization data is output (block 408).

Figure 5:
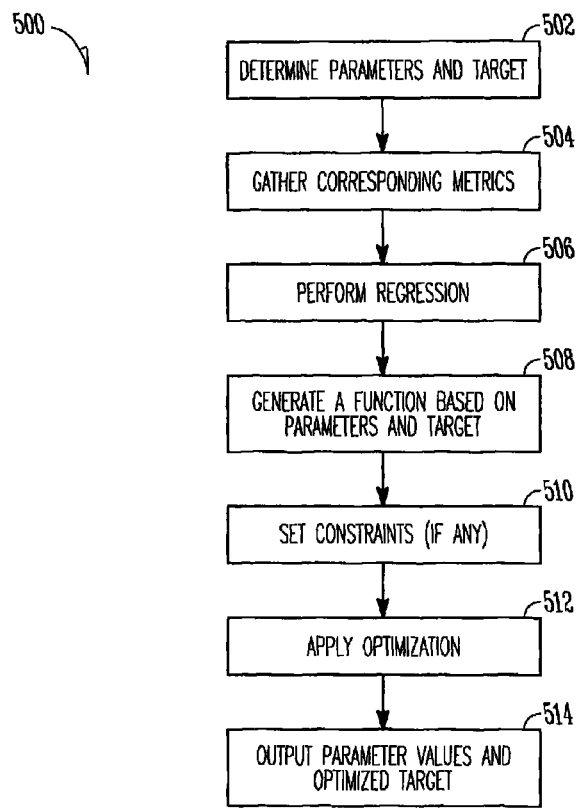
FIG. 5 is a more detailed flow diagram illustrating several methods according to various embodiments.
Figure 6:
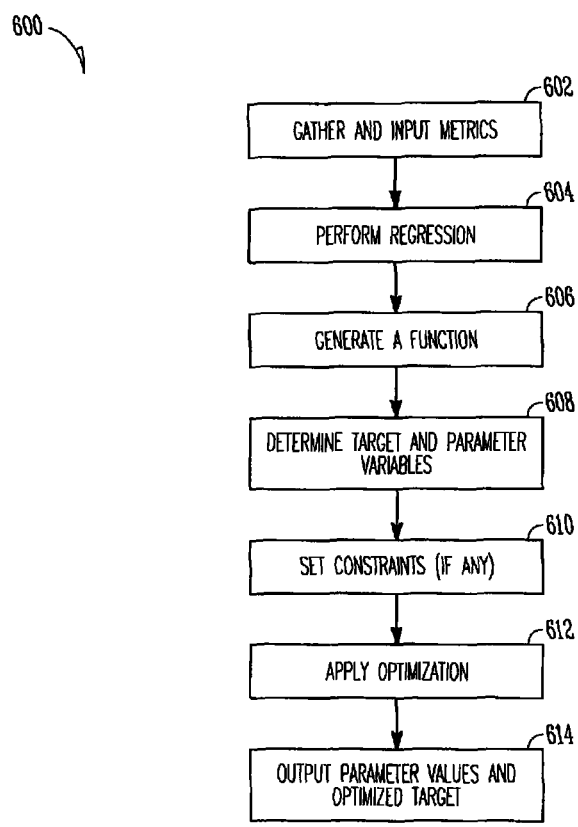
FIG. 6 is a more detailed flow diagram illustrating several methods according to various embodiments.

FIGS. 5 and 6 represent in more detail two examples according to various embodiments. In accordance with the method 500 in FIG. 5, the parameters and target variables are initially selected (block 502). Corresponding metrics are then gathered with reference to these parameters and target variables (block 504). A regression analysis is performed on the metrics (block 506) to generate a regression function based on other independent metrics, the pre-determined parameters and the target variable (block 508). The result should present the target as a function of the metrics and parameters, given that such a relation exists. Once the function is obtained, any additional constraints may be presented (block 510), and the function is then optimized to generate a minimum, maximum in the target, or fixed value (block 512). Finally, the optimized target value and the corresponding values of the parameters are output.

In an alternative method 600 represented in FIG. 6, the metrics are gathered first (block 602), and a regression analysis is performed (block 604). Based on the results of the regression analysis, the relationship between the variables represented by the metric data can be described as a function (block 606). With respect to the variables of the generated function, the target variable and the parameter variables may be determined (block 608). The following steps of the method will follow just like the previous example illustrated in FIG. 5. Once any constraints are set on the parameters, (block 610), the function is optimized to maximize, minimize or locate a fixed value of the target (block 612), and the results are output (block 614).

Example Implementations

Various examples of systems and methods for embodiments of the inventive subject matter have been described above. In this section, FIGS. 7 and 8 illustrate exemplary implementations according to various embodiments.

Figure 7:
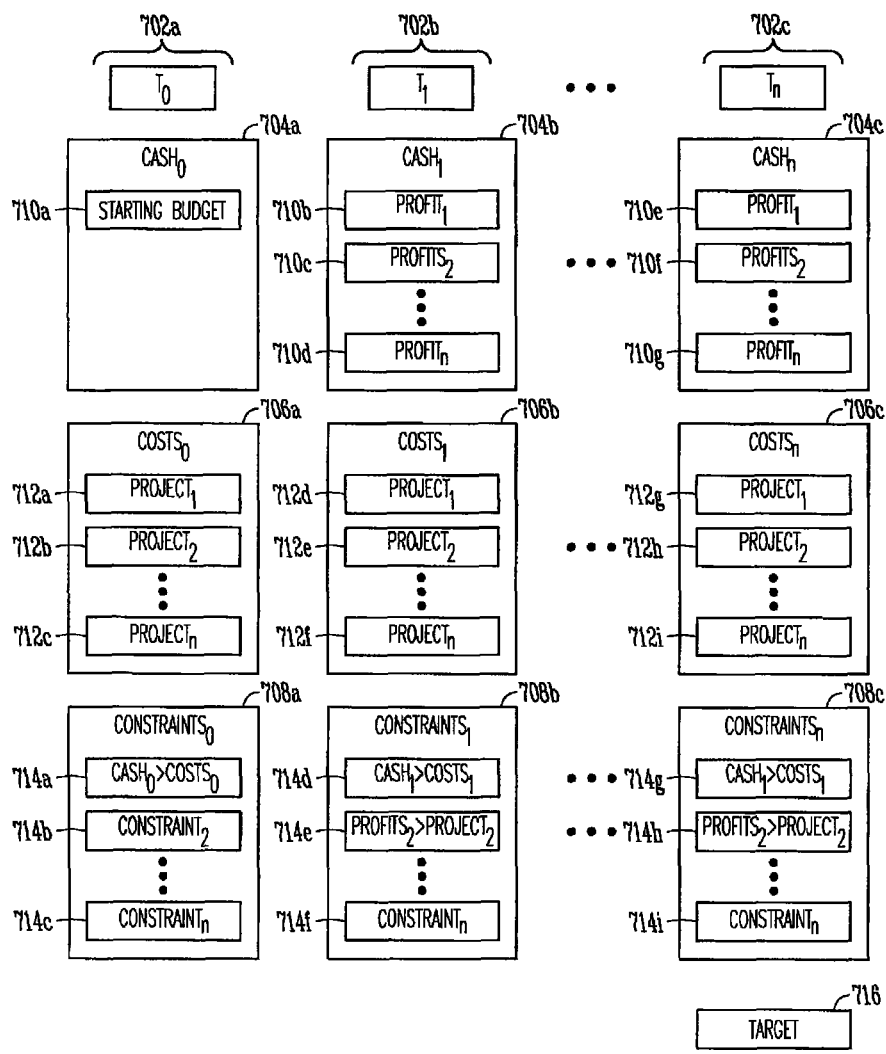
FIG. 7 is a block diagram of a financial application according to another embodiment.
Figure 8:
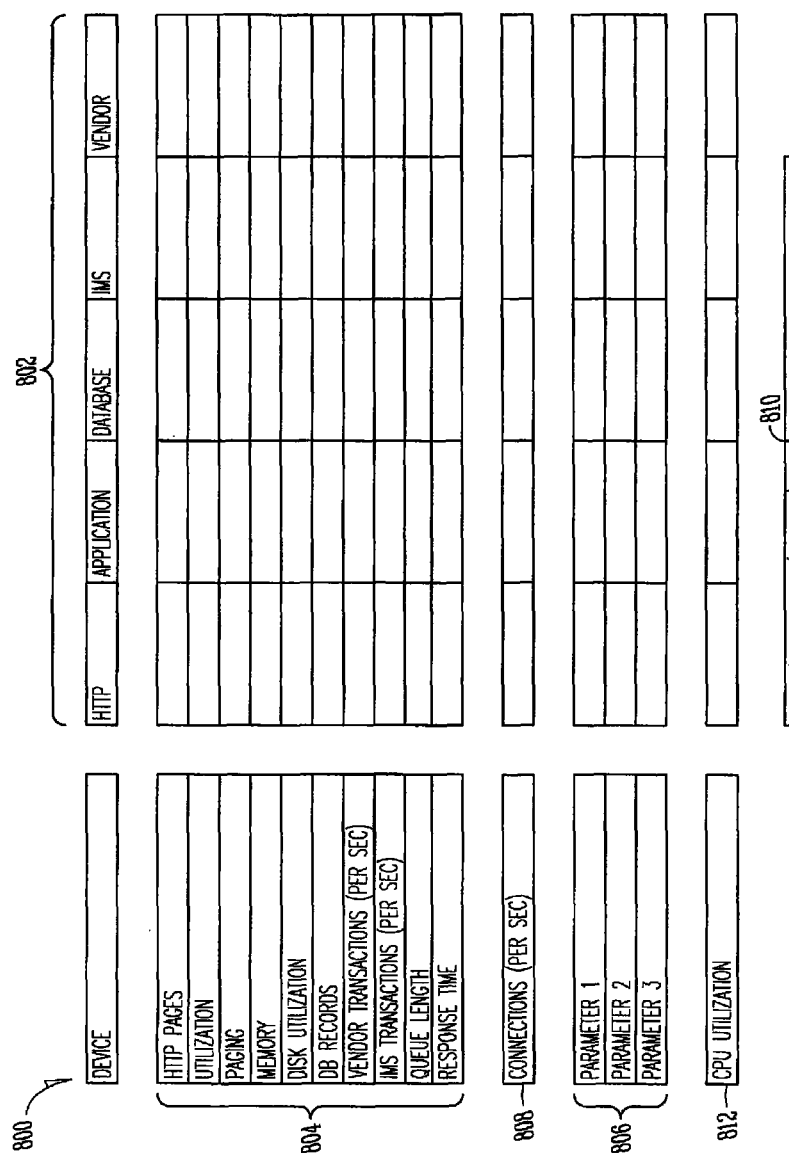
FIG. 8 is a block diagram of an IT application according to another embodiment.

FIG. 7 illustrates a situation where a regression and optimization system may be employed in a financial analysis application according to various embodiments. Each column represents a timeframe 702, which may be a month, a quarter, a year, etc. Beneath each timeframe, is a cash module 704, a costs module 706 and a constraints module 708. The cash module 704 contains sources of cash 710 that may be available. For example in timeframe $T_0$ 702a, a source of cash 710a is the starting budget. As the timeframes move along, the sources of cash 710 may also be profits or other forms of income.

The costs module 706 contains business or financial projects 712 which may be employed. These projects 712 may include marketing campaigns, incentives, policy changes, technology changes, and others. Each project 712 has an associated cost, which is why they are grouped under the cost modules 706.

The constraints module 708 contains defined constraints 714 which may be applied to limit the projects 712 of the costs module 706 or the profits 710 of the cash module. For example, one constraint 714a may require that the sum of the cost of the projects 712 in the costs module 706 be less than the sum of the profits or cash sources 710 in the cash module 704. Another constraint 714e might be that the profits from a particular project must be greater than the costs from that project. The constraints 714 are related to the costs and benefits of the projects 712 and cash sources 710, and may be used to limit the amount of money spent.

Data related to each of the cash modules 704 and cost modules 706 over a range of timeframes 702 may be collected, or may be determined based off of previous related data. Using regression analysis, relationships between the cash sources 710 in the cash modules 704 and the projects 712 in the costs modules 706 may be determined. A target 716 to be optimized may be chosen such that it can be defined as a function of at least one of the elements of the modules. The target 716 could be a number of characteristics, including: maximizing overall profits, minimizing the number of projects, maximizing the amount of profit from a particular source, and others. Once a relational function is determined with respect to the various cash sources 710 and projects 712, it may be optimized to give the desired result which may be applied to realize the optimized target.

FIG. 8 shows data used in an optimization system according to various embodiments. This particular figure illustrates the use of the optimization system in an Information Technology (IT) environment 800. In this example, a particular computing setup is provided and broken down into its major components 802. Here, the components 802 are an HTTP server, and application server, a database, an information management system, and a vendor unit. Each component 802 may relate to some but not necessarily all of the measured metrics 804. The metrics 804 include measurable or determinable characteristics of each component 802. Each component also has characteristic parameters 806 which can affect its performance, as generally represented by the data within the metrics 804. The specific parameters 806 may be different for each component 802. The parameters may include, but are not limited to, for example, configuration settings like a maximum number of users, cache size, buffer length, and others. Some of the parameters 806 may be the same or similar between components 802, but they need not be. Each component 802 may have its own types of parameters 806.

Data may be gathered with respect to the various metrics 804 and parameters 806. A target 808 may also be determined. In this case, the target 808 is total connections per second. A regression analysis will be done to determine the relationship between the target 808, the parameters 806 and the metrics 804. The relationships are determined across the various components 802 in the system, and a function is derived from those relationships. Once a function is derived, it is optimized with respect to the target 808. In this case, connections per second is the target, and a benefit will be realized out of it being maximized. An optimization technique may be used to determine the maximum target value 810, based on the values of the metrics 804 and the parameters 806.

Additionally, one or more constraints 812 may be added to limit the optimization. In the IT environment 800, a constraint 812 is provided regarding CPU utilization. In this case, the value for CPU utilization for each component 802 must be equal to or less than 100%, and must also be greater than or equal to zero. Once optimized, the target value 810, maximum number of connections per second, is determined as well as the particular parameter 806 values that bring about the desired result.

By using the regression and optimization system disclosed, the IT environment 800 of FIG. 8 may be optimized so the components 802 may be configured to provide the maximum number of connections per second.

According to various embodiments a regression and optimization system may be implemented in a number of ways. The regression and optimization system may exist as a third-party or external product utilized as an add-on to an existing system, or it may be a built-in or internal device on a particular system. As a third party device the regression and optimization system would communicate with the system to which it is attached to receive data and adjust parameters to optimize that system. According to one embodiment, in a network example, the regression and optimization system may include software and sensors to monitor various characteristics of the network in order to perform the regression and optimization steps to optimize a target. The software and sensors may act to collect data on demand or on a periodic or continuous basis to maintain optimization. According to another embodiment, in a financial example, the regression and optimization system may attach to a financial analysis system. In this case, the device may connect to a service to receive inputs regarding changing market conditions. The connected service may be the internet or other network or proprietary service.

In accordance with these examples and other embodiments, the regression and optimization system may attach to existing systems to allow those systems to operate under optimized conditions. As mentioned, the regression and optimization system may also be implemented as a built-in module in a larger system. In either case, whether external or internal, the regression and optimization system may be implemented as a software module or as a hardware device, or a combination of both software and hardware.

Figure 9:
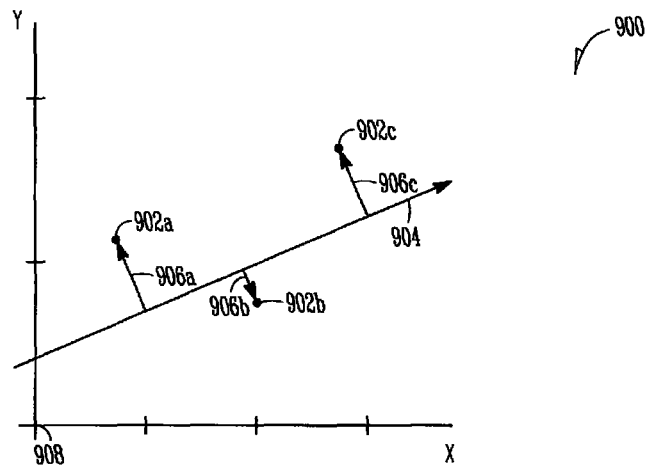
FIG. 9 is a diagram illustrating a regression technique according to various embodiments.

FIG. 9 illustrates an example regression technique according to various embodiments. Chart 900 includes data points 902a-c, regression vector 904, error vectors 906a-c, and the origin 908.

Data may be collected and gathered to determine relationships. This data may include metrics. When mapped graphically on a chart 900, the data points 902a-c represent the gathered data. The regression technique will produce an equation that represents the regression vector 904 that goes through the center of the data points 902a-c in the chart 900 such that the distance from each data point 902a-c to the regression vector 904 is minimum. Error vectors 906a-c represent the line from each data point 902a-c to the regression vector 904 respectively. The goal in this case is to minimize the average sum square of the error vectors 906a-c. If the error vectors 906a-c are represented by the variables $e_a$, $e_b$, and $e_c$ respectively, the function $f$ to minimize would be represented by the following equation:

$$f = \frac{(e_a^2 + e_b^2 + e_c^2)}{3}$$

Minimizing the function $f$ is accomplished by the fact that the dot product of two perpendicular vectors is zero. For example, if $a=(x_1, y_1)=(0,1)$ and $b=(x_2, y_2)=(1,0)$ as in FIG. 3, then the dot product is $$\begin{aligned}a \cdot b &= (x_1, y_1) \cdot (x_2, y_2). \\ &= x_1 x_2 + y_1 y_2 \\ &= 0 \cdot 1 + 1 \cdot 0 \\ &= 0\end{aligned}$$

Every data point 902a-c in the chart 900 has a line that goes through it and the origin 908. The vector going through the first data point 902a will be b. The projection of the vector b onto the regression vector 904 (which will be called vector a in the proceeding equations) is represented by the vector p. The error vector 906a between the regression vector 904 and the data point 902a will be e. It follows that b=p+e and then e=b−p. Note that p=a$\hat{x}$, where $\hat{x}$ is the value of x where e touches the vector a. Then e=b−a$\hat{x}$. The fact that e is perpendicular to a may now be used:

$$\begin{aligned}a^T e &= 0 \\ &= a^T(b - a\hat{x}) \\ &= a^T(b - a\hat{x}) \\ &= a^T b - a^T a \hat{x}\end{aligned}$$

The regression equation for the vector a that was initially sought is:

$$a^T b = a^T a \hat{x}. \quad (1)$$

From this a best possible solution in the least square sense may be obtained:

$$\hat{x} = (a^T a)^{-1} a^T b. \quad (2)$$

This is the main result and used for this regression technique according to an embodiment and in the examples that follow.

Initially the equation had no solution (since not all data points 902*a-c* go through the regression vector 904 in the chart 900): b=a$\hat{x}$; but when both sides are multiplied by $a^T$, the equation is solvable, since $a^T a$ is square and thus has an inverse (unless one of its columns is not independent).

The process proceeds by determining the least square solution. Using the equation of a line, y=mx+b and determining y for various values of x in the chart 900, the following set of equations may be determined (assuming for example that the data points 902*a-c* correspond to (1,1), (2,1), and (3,2) respectively)

$$y_1 = 1 = mx_1 + b = m(1) + b$$

$$y_2 = 1 = mx_2 + b = m(2) + b.$$

In matrix form, they become:

$$y_3 = 2 = mx_3 + b = m(3) + b$$

$$b = \begin{bmatrix} 1 \\ 1 \\ 2 \end{bmatrix}, a = \begin{bmatrix} 1 & 1 \\ 2 & 1 \\ 3 & 1 \end{bmatrix} \text{ and } x = \begin{bmatrix} m \\ b \end{bmatrix}.$$

Which may be rewritten as:

$$\begin{bmatrix} y_1 \\ y_2 \\ y_3 \end{bmatrix} = \begin{bmatrix} 1 \\ 1 \\ 2 \end{bmatrix} = \begin{bmatrix} 1 & 1 \\ 2 & 1 \\ 3 & 1 \end{bmatrix} \begin{bmatrix} m \\ b \end{bmatrix} \quad (3)$$

or $$b = ax.$$

Note that a has two columns, the basis, each of which is independent of the other (representing the slope and y-intercept, which are generally expected to be independent of each other). Next, both sides of equation 3 are multiplied by $a^T$ (as in equation 1) and use equation 2 to find the least squares solution:

$$\hat{x} = (a^T a)^{-1} a^T b$$

$$= \left( \begin{bmatrix} 1 & 2 & 3 \\ 1 & 1 & 1 \end{bmatrix} \begin{bmatrix} 1 & 1 \\ 2 & 1 \\ 3 & 1 \end{bmatrix} \right)^{-1} \begin{bmatrix} 1 & 2 & 3 \\ 1 & 1 & 1 \end{bmatrix} \begin{bmatrix} 1 \\ 1 \\ 2 \end{bmatrix}$$

$$= \begin{bmatrix} 1/2 \\ 1/3 \end{bmatrix}$$

This means that the equation that minimizes the average sum square of error vectors 906*a-c* is y=1/2x+1/3; this is the regression equation representing the regression vector 904 in two dimensions. This generates a relationship between y and two independent variables (the basis), the slope m and the y-intercept, b.

The analysis may be applied to a more complicated example. This example, according to an embodiment, will take samples from a computer system and measure various utilization metrics and apply regression to find a relationship between a CPU and the metrics on another directly connected system. Disk, memory, and network utilization will be used as an independent basis and seek an $\hat{x}$, that best approximates their relationship with a cpu: cpu=$a_0$disk+$a_1$mem+$a_2$net, where $a_0$, $a_1$ and $a_2$ are the coefficients in $\hat{x}$ to be determined.

In this example a basis is chosen, a=(disk, mem, net). Other bases could be used such as a=(disk$^2$, mem$^5$, net$^3$) or a=(exp (disk), log(mem), net), the least square solutions of which may produce results better or worse than that of the chosen basis.

Continuing with the example, sample data may be collected for 25 time instants and a table listing is created with the results:

| Time Instant | CPU (SpecInts) | Disk (throughput) | Memory (bytes) | Network (bits per second) |
|---|---|---|---|---|
| t0 | 327 | 321 | 603 | 3594 |
| t1 | 409 | 7 | 380 | 4353 |
| t2 | 163 | 194 | 871 | 2185 |
| t3 | 4.6 | 344 | 367 | 200 |
| t4 | 365 | 288 | 446 | 3877 |
| t5 | 141 | 308 | 942 | 1973 |
| t6 | 285 | 138 | 432 | 3111 |
| t7 | 451 | 70 | 691 | 4972 |
| t8 | 18 | 81 | 728 | 663 |
| t9 | 131 | 143 | 743 | 1783 |
| t10 | 219 | 374 | 653 | 2536 |
| t11 | 192 | 87 | 330 | 2120 |
| t12 | 463 | 194 | 190 | 4707 |
| t13 | 201 | 77 | 801 | 2551 |
| t14 | 368 | 291 | 838 | 4184 |
| t15 | 315 | 47 | 290 | 3343 |
| t16 | 267 | 157 | 78 | 2682 |
| t17 | 354 | 268 | 60 | 3499 |
| t18 | 319 | 80 | 265 | 3356 |
| t19 | 213 | 79 | 616 | 2541 |
| t20 | 210 | 193 | 869 | 2647 |
| t21 | 250 | 193 | 516 | 2808 |
| t22 | 367 | 269 | 88 | 3655 |
| t23 | 264 | 334 | 932 | 3188 |
| t24 | 266 | 70 | 148 | 2742 |
| t25 | 404 | 126 | 964 | 4676 |

Each column is then collected to form a matrix:

$$b = \begin{bmatrix} cpu(t_0) \\ cpu(t_1) \\ \vdots \\ cpu(t_{25}) \end{bmatrix}, a = \begin{bmatrix} disk(t_0) & mem(t_0) & net(t_0) \\ disk(t_1) & mem(t_1) & net(t_1) \\ \vdots & \vdots & \vdots \\ disk(t_{25}) & mem(t_{25}) & net(t_{25}) \end{bmatrix} \text{ and } x = \begin{bmatrix} a_0 \\ a_1 \\ a_2 \end{bmatrix}$$

Thus b=ax.
Using equation 2 once again, the solution is:

$$\hat{x} = \begin{bmatrix} .03 \\ -.07 \\ .1 \end{bmatrix}.$$

Thus cpu can be written as a function of the other independent variables: cpu=0.03·disk−0.07·mem+0.1·net. In addition to the simple basis just presented, the metric values collected could be functions of lagged variables. For example, $cpu(t)=a_0 disk(t)+a_1 disk(t-1)+a_2 disk(t-2)+a_3 mem(t-4)+a_4 net(t-9)$. This would be an alternative basis for the regression vector 904 (vector a) above.

These examples should not be construed to limit the inventive subject matter to IT or financial applications. Various embodiments may be applied to other fields which include but are not limited to risk management, insurance, productivity, resource allocation, operations research, actuary, voice systems, business, science, engineering, control systems, industrial plants, transportation, agriculture, security, public policy, healthcare, investment, software development, capacity planning, performance management, and other applications where a number of factors influence an end result.

Hardware and Operating Environment

This section provides an overview of an example hardware and the operating environments in conjunction with which embodiments of the inventive subject matter can be implemented.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-oriented format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 10 below.

Figure 10:
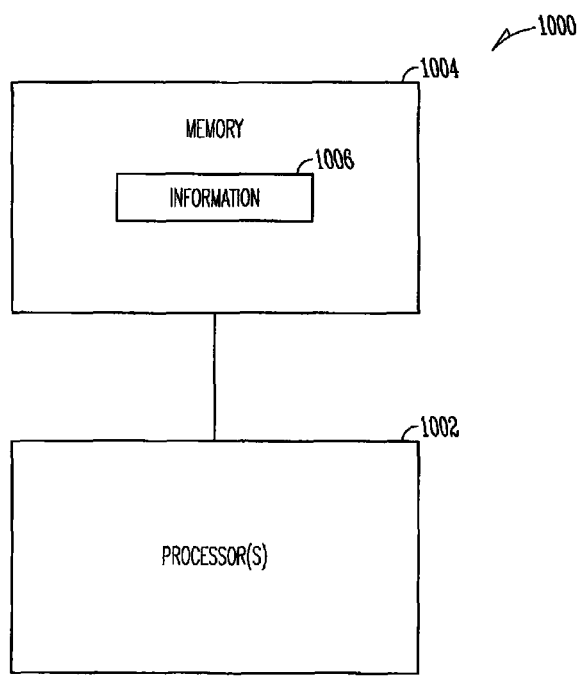
FIG. 10 is a block diagram of an article according to various embodiments.

FIG. 10 is a block diagram of an article 1000 according to various embodiments of the invention. Such embodiments may comprise a computer, a memory system, a magnetic or optical disk, some other storage device, or any type of electronic device or system. The article 1000 may include one or more processor(s) 1002 coupled to a machine-accessible medium such as a memory 1004 (e.g., a memory including electrical, optical, or electromagnetic elements). The medium may contain associated information 1006 (e.g., computer program instructions, data, or both), which, when accessed, results in a machine (e.g., the processor(s) 1002) performing the activities previously described herein.

Implementing the apparatus, systems, and methods disclosed herein may allow a system to be analyzed and optimized in a methodical manner in order to achieve consistent, reliable, repeatable, and optimal results.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. A system comprising:
a regression computer subsystem to:
receive identification of:
a number of components of a financial analysis application, wherein the financial analysis application includes funding data from a plurality of funding sources during a time frame and expense data from a plurality of project associated costs during the time frame;
input values of a number of independent variables of the financial analysis application including:
a number of metrics, each metric measuring or determining a characteristic of at least one of the number of components;
a number of parameters, each parameter affecting performance of at least one of the number of components; and
input values of a number of dependent variables of the financial analysis application including a target; and
perform regressions analysis to determine at least one relationship between the input values of the number of independent variables and the input values of the number of dependent variables and generate one or more regression functions expressing the at least one relationship, wherein the one or more regression functions result in the target as a function of at least one of the number of independent variables; and
an optimization computer subsystem to analyze the one or more regression functions and generate an optimized target, wherein the optimized target includes a determined target value of the target and a determined value for each of the at least one independent variables to produce the determined target value using the one or more regression functions;
wherein the system generates a new optimized target in response to at least one of the number of components being updated and the updated component having a different value for at least one of the number of independent variables, wherein the at least one of the number of updated components includes a change in an operating capability of the updated component.

2. The system of claim 1, wherein the number of dependent variables includes metric data.

3. The system of claim 1, wherein at least one parameter influences the one or more regression functions.

4. The system of claim 1, the optimization computer subsystem further analyzes at least one constraint function.

5. The system of claim 4, wherein generation of the optimized target is based on the analysis of the one or more regression functions and analysis of the at least one constraint function.

6. The system of claim 1, wherein the optimization computer subsystem further generates at least one parameter corresponding to the optimized target.

7. A computer-implemented method comprising:
receiving identification with a computing device, of:
a number of components of a financial analysis application, wherein the financial analysis application includes funding data from a plurality of funding sources during a time frame and expense data from a plurality of project associated costs during the time frame;
input values of a number of independent variables of the financial analysis application including:
a number of metrics, each metric measuring or determining a characteristic of at least one of the number of components;
a number of parameters, each parameter affecting performance of at least one of the number of components; and
input values of a number of dependent variables of the financial analysis application including a target; and
performing regression analysis to determine at least one relationship between the input values of the number of independent variables and the input values of the number of dependent variables with the computing device;
generating one or more regression functions expressing the at least one relationship with the computing device, wherein the one or more regression functions result in the target as a function of at least one of the number of independent variables;
analyzing the one or more regression functions with the computing device;
generating an optimized target with the computing device, wherein the optimized target includes a determined target value of the target and a determined value for each of the at least one independent variables to produce the determined target value using the one or more regression functions; and
generating a new optimized target in response to at least one of the number of components being updated and the updated component having a different value for at least one of the number of independent variables, with the computing device, wherein the at least one of the number of updated components includes a change in an operating capability of the updated component.

8. The method of claim 7, wherein the number of dependent variables includes metric data.

9. The method of claim 7, wherein at least one parameter influences the one or more regression functions.

10. The method of claim 7, further comprising receiving at least one constraint function.

11. The method of claim 10, wherein generation of the optimized target is based on analysis of the one or more regression functions and analysis of the at least one constraint function.

12. The method of claim 7, further comprising generating at least one parameter corresponding to the optimized target.

13. An article including a machine-accessible medium having associated information, wherein the information results in a machine performing a method comprising:
receiving identification of:
a number of components of a financial analysis application, wherein the financial analysis application includes funding data from a plurality of funding sources during a time frame and expense data from a plurality of project associated costs during the time frame;
input values of a number of independent variables of the financial analysis application including:
a number of metrics, each metric measuring or determining a characteristic of at least one of the number of components;
a number of parameters, each parameter affecting performance of at least one of the number of components; and
input values of a number of dependent variables of the financial analysis application including a target; and
performing regression analysis to determine at least one relationship between the input values of the number of independent variables and the input values of the number of dependent variables;
generating one or more regression functions expressing the at least one relationship, wherein the one or more regression functions result in the target as a function of at least one of the number of independent variables;
analyzing the one or more regression functions;
generating an optimized target, wherein the optimized target includes a determined target value of the target and a determined value for each of the at least one independent variables to produce the determined target value using the one or more regression functions; and
generating a new optimized target in response to at least one of the number of components being updated and the updated component having a different value for at least one of the number of independent variables, wherein the at least one of the number of updated components includes a change in an operating capability of the updated component.

14. The article of claim 13, wherein the number of dependent variables includes metric data.

15. The article of claim 13, wherein at least one parameter influences the one or more regression functions.

16. The article of claim 13, further comprising receiving at least one constraint function.

17. The article of claim 16, wherein generation of the optimized target is based on analysis of the one or more regression functions and analysis of the at least one constraint function.

18. The article of claim 13, further comprising generating at least one parameter corresponding to the optimized target.

* * * * *